US005768405A

United States Patent [19]
Makram-Ebeid

[11] Patent Number: 5,768,405
[45] Date of Patent: Jun. 16, 1998

[54] DIGITAL IMAGE PROCESSING METHOD FOR LOCAL DETERMINATION OF THE CENTER AND THE WIDTH OF OBJECTS IN THE FORM OF CONTRASTING BANDS ON A BACKGROUND

[75] Inventor: Shérif Makram-Ebeid, Dampierre, France

[73] Assignee: U.S Philips Corporation, New York, N.Y.

[21] Appl. No.: 721,523

[22] Filed: Sep. 26, 1996

Related U.S. Application Data

[63] Continuation of Ser. No. 278,484, Jul. 20, 1994, abandoned.

[30] Foreign Application Priority Data

Jul. 22, 1993 [FR] France .................................. 93 09055

[51] Int. Cl.[6] .................................................. G06K 9/44
[52] U.S. Cl. ........................... 382/128; 382/264; 382/265
[58] Field of Search .................................. 382/128, 199, 382/257, 260, 264, 265, 279

[56] References Cited

U.S. PATENT DOCUMENTS

| | | | |
|---|---|---|---|
| 4,503,461 | 3/1985 | Nishimura | 378/99 |
| 5,210,688 | 5/1993 | Cheu et al. | 382/279 |
| 5,297,550 | 3/1994 | Margosian | 382/128 |
| 5,351,305 | 9/1994 | Wood et al. | 382/128 |

OTHER PUBLICATIONS

Kottke et al. "Segmentation of Coronary Arteriograms . . ." Aug. 1990, pp. 778–785.

"Automated Identification Of Vessel Contours In Coronary Arteriograms By An Adaptive Tracking Algorithm" Y. Sun, IEEE Trans. On Med. Imaging, vol. 8, No. 1, Mar. 1989, pp. 78–88.

"Coronary Artery Dimensions From Cineangiograms-Methodology And Validation Of A Computer—Assisted Analysis Procedure" R. Reiber et al, IEEE Trans. On Med. Imaging, vol. MI-3, Sep. 1984, pp. 131–141.

Optimization Of Morphological Structuring Elements for Angiogram Enhancement, S. Andress et al, SPIE vol. 1445, Image Processing (1991), pp. 6–10.

*Primary Examiner*—Christopher S. Kelley
*Attorney, Agent, or Firm*—Jack D. Slobod

[57] ABSTRACT

Digital image processing method for local determination of the center and the width of objects in the form of contrasting bands on a background. A digital image processing method, for representation of objects in the form of contrasting bands of substantially uniform intensity on a substantially uniform background, includes a step for the identification of pixels situated on the central lines of the objects, which step is referred to as a "tracking" step. This method is characterized in that the step includes a first filtering operation which is executed by applying, to each image, a series of N lozenge-type-bidimensional, selective, recursive low-pass filters having respective ones of the principal directions angulary spaced apart 180°/N in order to determine the direction of each band-shaped object segment as that in which the response of one of the filters is maximum.

18 Claims, 8 Drawing Sheets

DIGITAL IMAGE PROCESSING METHOD FOR LOCAL DETERMINATION OF THE CENTER AND THE WIDTH OF OBJECTS IN THE FORM OF CONTRASTING BANDS ON A BACKGROUND

This is a continuation of application Ser. No. 08/278,484 filed Jul. 20, 1994 now abandoned.

BACKGROUND OF THE INVENTION

1. Field of the Invention

The invention relates to a method for the processing of a digital image, comprising the representation of objects in the form of contrasting bands of substantially uniform intensity on a substantially uniform background, which includes a step for the identification of pixels situated on the central lines of the objects, referred to herein as a "tracking" step.

The invention is used, for example in the field of digital imaging systems in order to facilitate the detection of anormalies, such as stenosis, on the basis of arteriograms of a human or animal body.

2. Description of the Related Art

Arteriograms are special images for the visualization of blood vessels. Various types of arteriograms can be formed: coronary arteriograms for the imaging of arteries for the muscular tissue of the heart, or myocardium, which arteries together form the coronary tree; peripheral arteriograms for visualizing the feeding of the upper and lower members; cerebral arteriograms. By way of example, the following description will relate to the coronary arteriograms. Stenoses are local strictures which are caused by partial or complete obstructions occurring in the arteries. In the coronary tree, stenoses seriously impair the feeding of the myocardium and must be detected by a radiologist on the basis of arteriograms.

The introduction in recent years of digital radiography, combining the use of an X-ray detector providing a real-time image and the digitization of the images, constitutes a major step forward in the field of imaging in comparison with conventional radiography. It actually gives access to numerous possibilities offered by the digital image processing techniques.

Other methods of forming angiographic images are also known, for example the methods utilizing magnetic resonance.

The invention, however, takes into account neither the method used to obtain the digital image, nor the nature of the objects represented therein, but relates exclusively to the processing of this digital image in order to determine the central points and the edge points of the objects represented, provided that these objects constitute sufficiently uniform, contrasting masses on a sufficiently uniform background.

A method for the automated identification of the contours of vessels in coronary arteriograms is known from the publication "Automated Identification of Vessel Contours in Coronary Arteriograms by an adaptive Tracking Algorithm", by Ying Sun, published in IEEE Transactions on Medical Imaging, Vol. 8, No. 1, March 1989. This document describes an algorithm for tracking the central line of the vessels for ultimate identification of the contours of these vessels in digitized arteriograms. The algorithm essentially comprises three steps:

1) The identification of the points situated on the central line of a vessel. Each point of the central line has three attributes: its position, the direction of a vector parallel to the direction of the vessel segment whereto the point belongs, and the half-width of the vessel at this point. Given a starting point $P_k$ on the central line of the vessel, the algorithm calculates a point $\tilde{P}_{k+d}$ at a given distance d in the direction of the attribute vector of the starting point $P_k$. Subsequently, convolution filtering is performed by means of a rectangular filter having a principal orientation perpendicular to said vector, i.e. parallel to the scanning direction at the starting point $P_k$.

This filtering enables identification of a given point $P'_{k+d}$ which is determined by performing the convolution between the real density profile along the scanning line passing through the point $\tilde{P}_{k+d}$ and an ideal density profile of rectangular shape. The convolution results in a vector for which the maximum value is searched, which maximum value relates to a pixel which corresponds to the maximum of the intensity profile and enables the updating of the new central point $P'_{k+d}$.

2) The identification of edges of the vessel: the edges of the vessel which correspond to the new central point $P'_{k+d}$ are identified as the position of the points of inflection on a transverse intensity profile, i.e. perpendicularly to an attribute vector of the point $P'_{k+d}$ resulting from an updating operation. The half-width of the vessel is thus also updated, after which the new definitive central point $P_{k+d}$ of the central line searched is finally identified on the basis of these edges.

The process is repeated for all points situated on the scanning lines perpendicular to the first attribute vector of the starting point $P_k$: from k+1 to k+d. This directional vector is maintained so as to be the same over the entire distance d. The scanning direction changes each time when the direction of the vector changes.

In the case of a bifurcation, the process chooses the branch of the vessel having the highest intensity, so that the updated intensity profile does not exhibit a double peak.

3) Spatial averaging: this tracking process produces a description of the vessel with N inputs. Each input is characterized by a triplet: position of a point on the central line of the vessel; the direction of a vector parallel to the central line in a segment of length d, chosen as a function of the curvature of the vessel; half-width of the vessel at this point.

A first technical problem encountered in the processing of arteriograms is the detection of all pathological conditions and the elimination of false alarms.

As opposed to what is stated in the cited document, the pathological conditions, do not concern exclusively stenoses appearing in the form of a local stricture in a vessel which thus simply exhibits a local minimum of the width. The pathological conditions also concern a type of stricture which is referred to as a "step" which appears, in a vessel having a substantially uniform first width, as an abrupt transition to a second width which is smaller than the first width. This type of step may signify that a vessel is concerned which is referred to as a principal vessel of a first width which branches into two vessels, one of which, i.e. the vessel having the second width, is still visible in the prolongation of the principal vessel, whereas the other vessel is completely occluded as from the point where it is branched from the principal vessel and has disappeared, i.e. become completely invisible in the arteriogram.

The sole means of detecting such a completely occluded and invisible vessel is to detect the "stepped" stricture in the principal vessel.

The latter pathological condition cannot be recognized by the algorithm described in the cited state of the art; this is because the tracking of the vessel aims to follow the path of the principal vessel and to eliminate that of the secondary vessels. Thus, the known method is not capable of distinguishing the case where a "step" occurs due to the fact that after branching one of the two secondary vessels has completely disappeared, being a serious pathological case, from the non-pathological case where the two secondary vessels are still present at the bifurcation. As the characteristic shape of the "step" is the only alarm enabling the radiologist to uncover the occluded vessels, this type of algorithm does not enable the radiologist detect these pathological conditions which are large in number as well as serious in relation to the condition of the patient.

A second technical problem encountered resides in the implementation of radiology apparatus provided with means for the fully automatic detection of the pathological conditions described above, i.e. the first condition involving local strictures of vessels, and the second condition involving "stepped" strictures. Fully automatic detection is to be understood to mean that the pathological conditions must be detected without assistance from an operator.

The formation of arteriograms is based on the assumption that a patient, usually awake, is injected with a contrast medium, for example via the femoral artery, by means of a catheter; subsequently, an operator makes a series of exposures of the coronary tree in the form of a series of video images, for example at a rate of 30images per second. Such a sequence enables the visualization of several cardiac cycles. The stenoses or strictures described above are the principal anomalies to be detected. However, such detection may be hampered by an unfavorable orientation of the vessels, or the course of a vessel in the background behind a vessel situated in the foreground. Therefore, it is necessary to use different projection angles and also to attempt detection of the stenoses in all images of the video sequence for which the concentration of the contrast medium is sufficiently strong to ensure good visibility of the vessels.

Thus, there are many of these images and the radiologist makes his diagnosis by studying these images as they slowly pass by. Therefore, there is a need to detect, in advance and automatically, the pathological conditions described above. Psychologically speaking, the radiologist tends to have his attention drawn to the most striking pathological conditions, and to ignore given conditions which are less visible but which may be more disturbing or serious, from a clinical point of view, with respect to health of the patient. The radiologist may also let given pathological conditions pass because they appear only in a single image, or in only a few images of the sequence.

Therefore, it is important that the radiologist has available a system for visualizing pathological conditions so that his attention is attracted to image areas, or the areas of the single image or a few images of the sequence, which actually contain the most interesting information which is indispensable for examination. Attention could thus be attracted to the a priori less likely areas which nevertheless contain pathological conditions; moreover, his attention could be drawn away from the focusing on a few stenoses which are evident but of less importance from a point of view of further medical actions.

Such full automation of the detection of the pathological conditions can be implemented only if in advance:
one succeeds in automating the detection of the position of objects in the digital image, for example by determination of the position of their center points,
one succeeds also in automating the detection of the position of their edges, or their contours, for example by the determination of their half-width in a given direction on the basis of the corresponding center point.

Such automation of the determination of the central lines and the contour lines ultimately enables automation of the detection of any anomaly relating to the dimensions or the shape of the objects in the digital image.

Such full automation of the detection of pathological conditions cannot be achieved when use is made of the algorithm known from the cited document.

The main reason of this drawback consists in that the algorithm which is known from the cited document is not accurate enough so as to be fully automated itself. The lack of accuracy is due to the fact that the algorithm determines the points of the central line of the vessel by successive approximations which start from a starting point, and that it utilizes density profiles of images containing noise. Errors can thus accumulate, which is a drawback when far-reaching automation is desired.

Consequently, because of this lack of accuracy this algorithm needs control. Actually, this algorithm may lead to the tracking of paths which are not vessels: it may become lost. Or it may lead to the skipping of interesting paths. Thus, it is necessary to return it to the path to be actually followed.

When a bifurcation appears during the tracking of the path of a vessel, the known algorithm is conceived to follow the branch showing the highest intensity, thus preventing the tracking of the secondary vessel, because the known algorithm cannot deal with the problem which arises when the intensity profile exhibits a double peak. The examination of the secondary vessels, therefore, must take place by repositioning the "starting point" of the algorithm, at the area of branching, onto the secondary vessel abandoned during a first passage, so as to execute the steps of the algorithm for tracking this secondary vessel. In order to track all vessels in a vital region considered, therefore, the known algorithm need be guided so that it cannot be fully automated.

Referring to FIG. 2 of the cited document, it is to be noted that an ideal intensity profile of rectangular shape is used to realize a convolution with the intensity profile obtained by transverse scanning of the vessel studied in order to determine a vector for which the maximum value is searched, which maximum value relates to the pixel corresponding to the maximum of the measured intensity profile. This pixel is retained as the updated point of the central line. In order to execute this operation, the width of the rectangular ideal profile is a priori fixed. The real width of the vessel cannot be determined during this step of the algorithm.

The width of the vessels is determined during a later step by identifying the edges of the vessel as the points of inflection to both sides of the maximum of the measured transverse intensity profile of the vessel. This step offers updating of the local width of the vessel which will be used for determining the width of the rectangular ideal profile used for determining the centre point during a later step.

SUMMARY OF THE INVENTION

It is an object of the present invention to provide a method for determining, in a digital image in which objects are represented as contrasting, substantially uniform bands on a substantially uniform background, the center points and the central lines, or medians, composed of these points, as well as the local widths of sections of the objects in directions locally perpendicular to these central lines.

It is another object of the invention to determine notably the center points and the edge points of any band-shaped object, i.e. of objects which are not necessarily the branches of blood vessels but which may be arbitrary objects in a digital image satisfying the conditions in respect of shape and contrast.

It is notably an object of the present invention to provide such a method which is accurate, i.e. in which the determination of a point does not depend on the determination of a preceding point followed by an approximation.

It is another object of the present invention to provide a method of this kind which need not be guided, i.e. which does not require imposition of starting points or which does not require the imposition of a specific search zone.

It is also an object of the present invention to provide a method which is capable of operating with any resolution and which enables the determination of the width of an object, regardless of the width determined during a previous step.

The present invention notably has for its object to provide such a method which can be fully automated.

In accordance with the invention, this object is achieved by means of a process as defined in the preamble, characterized in that said step comprises a first filtering operation which is executed by applying to each image a series of N lozenge-type selective, recursive, bi-dimensional selective low-pass filters, one of the principal directions of which is oriented regularly in the plane of the image of $\pi/N$ in $\pi/N$ in order to determine the direction of each band-shaped object segment as that where the response of one of the filters is maximum.

The invention also has for its object to provide a method capable of supplying the direction of each object segment with an as high as possible precision.

In accordance with the invention this object is achieved by means of the process which is also characterized in that, in order to improve the selectivity of the preceding filtering operation, the tracking step comprises a second operation which is executed by subtracting, from the intensity of each pixel, a fraction of the intensity of a pixel which is situated at a given transverse distance to its left with respect to the principal direction of the preceding low-pass filter and an equal fraction of the intensity of a pixel situated at the same distance to its right, said first and second operations being equivalent to the application, to each image, of a series of N bi-dimensional Laplacian filters having the same principal directions as the N preceding recursive low-pass filters.

It is an object of the invention notably to provide exact localization of the center points of band-shaped objects.

This object is achieved by means of the above process which is also characterized in that the tracking step comprises a third operation for the identification of points of central lines of band-shaped objects by determination of local maxima of the intensity response of the filters, transversely of the directions of the objects determined by the filtering during the first two operations.

BRIEF DESCRIPTION OF THE DRAWING

The invention will be described in detail hereinafter with reference to the accompanying diagrammatic drawings; therein.

DETAILED DESCRIPTION OF THE PREFERRED EMBODIMENT

Figure 1:
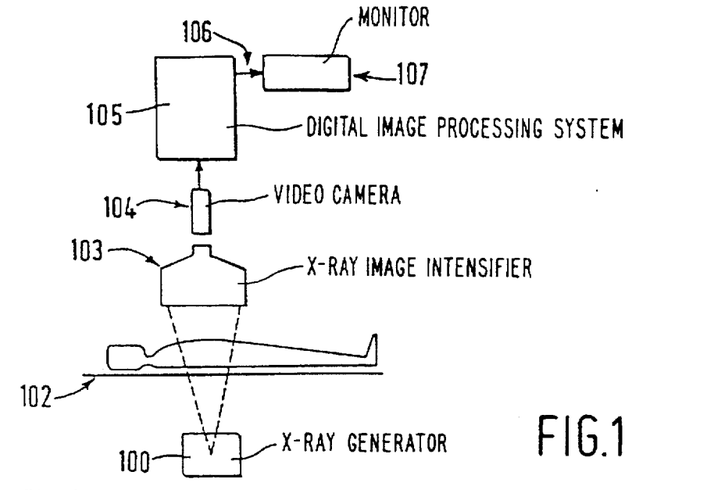
FIG. 1 shows a digital radiography system.

In an embodiment of the invention as shown in FIG. 1 a digital radiography system comprises an X-ray generator 100, a displaceable table 102 for accommodating a patient, and an image intensifier device 103 which is coupled to a video tube or camera 104 which applies data to a digital image processing system 105 which comprises a microprocessor. The latter comprises several outputs, an output 106 of which is coupled to a monitor 107 for the display of the radiographic image.

The digitized image obtained by radiography or other means may comprise, for example 512×512 pixels or 1024× 1024 pixels, encoded in 8 grey levels or intensity levels, where the lowest intensity level corresponds to the darkest regions.

Figure 2:
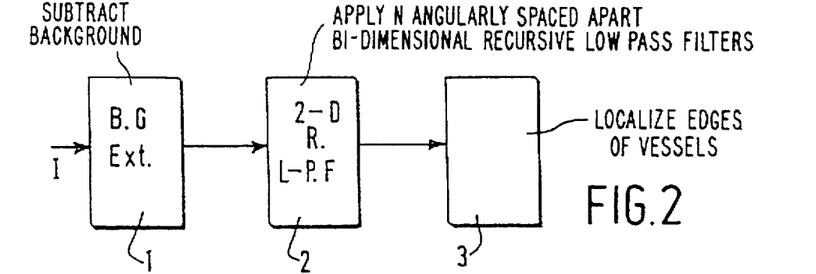
FIG. 2 shows a diagram with functional blocks corresponding to the various steps of the invention.

The invention proposes a method of processing digital images whose various steps are represented as functional blocks in the diagram of FIG. 2.

Referring to FIG. 2, the image processing method comprises the following steps:

STEP 1: BACKGROUND SUBTRACTION

This step corresponds to the functional block 1 of the diagram of FIG. 2.

Figure 3A:
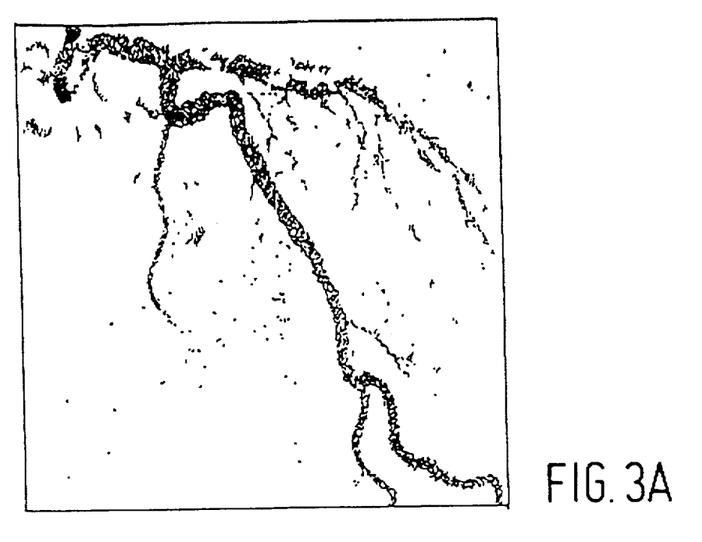
FIG. 3A shows a digital angiographic image which has been subjected to a first background extraction operation.

For each image of the sequence a logarithmic scale compression of the scale of the intensities is executed. The intensities of the pixels thus transformed become proportional to the X-ray absorption of the objects of the image. The vessels appear as dark structures on a lighter background. The background of the image is extracted by means of a morphological closing operation (referred to as B.G. Ext. in FIG. 2) by utilizing a three-dimensional structuring element. More specifically, a region of the image is considered to form part of the background either because its intensity varies very slowly in space, or because the contrast of the objects of small width present therein is the inverse of that of the vessels (i.e. light on a dark background). The background thus evaluated is algebraically subtracted from the image so as to obtain a new image in which the contrast of the vessels is strongly enhanced. Subsequently, the noise subsisting in the image background is reduced by way of, for example a dynamic thresholding operation, thus enabling an image as shown in FIG. 3A to be obtained.

For the morphological closing operation by means of a structuring element, reference is made to the publication "Optimization of Morphological Structuring Elements for Angiogram Enhancement" by Keith M. Andress and David L. Wilson, published in SPIE, Vol. 1445, Image Processing, 1991, pp. 610.

In order to execute the subtraction of the background of the image by mathematical morphology, a "mask" is construed so as to eliminate the elements of the background by determining the upper envelope of the intensity profiles in the image.

Figure 4:
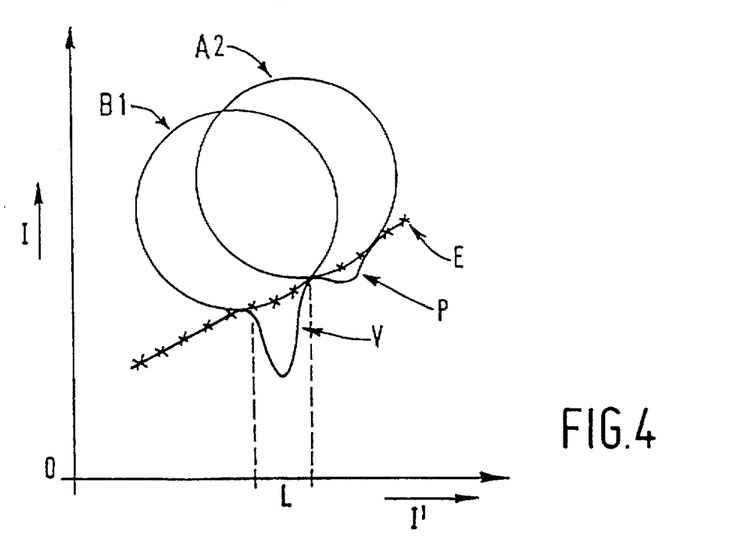
FIG. 4 illustrates a mathematical morphological operation carried out during a first step of the invention for background extraction.

FIG. 4 shows an intensity profile obtained by the scanning of a line or a column of the image. In this Figure, the profile P represents the intensity I as a function of the distance D in pixels in the image at the area of a vessel V.

At the vessel/background interface in the digital image the intensity of the pixels varies abruptly from low (vessels in black) to high (light background), even though in the background the intensity varies slowly or the elements have a contrast which is the reverse with respect to the vessel/background interface, i.e. they are brighter than the mean of the background. Moreover, the vessel V represents an object of width L which is comparatively small in the image. The mathematical treatment consists in passing an element B of spherical shape from the position $B_1$ to the position $B_2$ along the curves P of the intensity I, said sphere B having a diameter which is greater than the width L of the vessels so that the geometrical location of the lowest points E of the sphere B can be determined for the group of positions where the sphere B is tangent to the intensity profiles P. This geometrical location is referred to as the morphological closing of the image. It represents an estimate of the background, i.e. of the image without the vessels. Subsequently, there is executed a mathematical operation which consists in extracting the points situated in the background thus evaluated from the original image.

At the end of this first step, executed in the functional block 1 of FIG. 2, the image in principle contains only the single coronary tree as shown in FIG. 3A.

The expert can choose any other method of extracting the background so as to reveal the objects which are to be studied in the digital image in contrast on a substantially uniform background. The method for the processing of digital images in accordance with the invention then comprises successively the following fundamental steps: accurate estimation of the points of the central lines of the vessels by means of recursive, adaptive and oriented filters; determination of the edges of vessels on the basis of the exact knowledge of the points of the central lines.

The entire method for the processing of digital images in accordance with the invention aims to achieve complete automation of these operations.

STEP 2: ESTIMATION OF THE POINTS OF THE CENTRAL LINES OF THE VESSELS (TRACKING)

Phase 1: determination of the local orientations of the vessels

A first phase of this step 2 results in detection of segments of vessels which have a respective given, specific local orientation. The "segmentation" of vessels into segments extending parallel to these predetermined directions will subsequently enable, in a second phase, the accurate determination of the coordinates of the points or pixels located on the central lines or medians of the vessels, which lines constitute, as is known to those skilled in the art, the skeleton of the coronary tree.

This step 2, represented by the block 2 of FIG. 2, thus comprises a first processing phase which itself comprises two calculation operations or procedures.

The first operation is executed by the application of a series of recursive, adaptive and oriented mathematical filters (2-D.R.L.-P.F. in FIG. 2) to the image at the end of the preceding step 1 for background extraction.

The choice of these oriented filters allows for one of the problems involved in the processing of digitized angiographic images to be resolved, i.e. the problem residing in the fact that the calculations must on the one hand be very quickly executed and on the other hand that hardware means must be employed which are sufficiently standard so as to provide a tool which is both economical and effective.

A recursive filter is to be understood to mean a digital convolution filter which is applied, for example to a line of the image, the response of a given point (x−1) of said line serving to evaluate that of the next point (x) in conformity with an equation of the kind:

$$y^t(x)=y^{t-1}(x)+\alpha[y^t(x-1)-y^{t-1}(x)] \qquad (1)$$

Figure 5A:
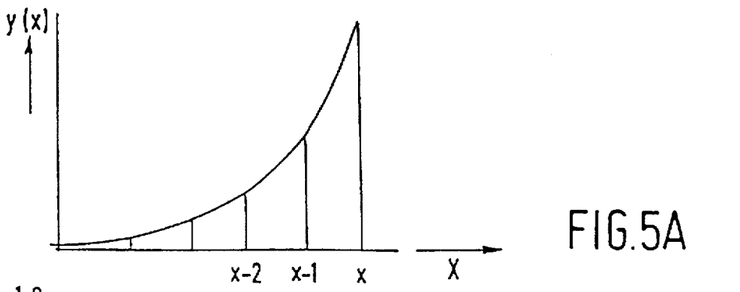
FIG. 5A shows a convolution kernel of a recursive mathematical filter upon a so-called causal pass.

Referring to FIG. 5A, illustrating the updating of this recursive function at each instant, the application of the filtering function across the digitized image, along scanning lines, updates a curve $y^t(x)$. In the representation of this curve, y is the intensity of the pixel coded in intensity levels, i.e. in grey levels in the present case; $y^0(x)$ is the initial intensity of the current pixel of the abscissa x on the scanning line; $y^{t-1}(x)$ is the intensity of the current pixel of the abscissa x for the preceding updating, i.e. the $(t-1)^{th}$ updating, and $y^t(x-1)$ represents the intensity of the pixel preceding the pixel x, to its left if the scanning is causal, i.e. from left to right, and for the $(t)^{th}$ updating. In this equation, α is a coefficient between 0 and 1 (0<α<1).

The function $y^t(x)$ thus provides the value of the intensity of the current pixel of the abscissa x at the instant t as the sum of the intensity of this pixel for the preceding iteration (t−1) and a term given by the product of a coefficient α and the difference of the intensity of the neighbouring pixel to the left of the abscissa (x−1) at the instant t and the intensity of the current pixel of the abscissa x for the preceding iteration (t−1).

This function is initialized by the initial value of the intensity of the current pixel x, referred to as $y^0$, and the first updating operation is performed:

$$y^1(x)=y^0(x)+\alpha[y^1(x-1)-y^0(x)] \qquad (1bis)$$

in which α multiplies a term representing the intensity of the neighbouring pixel to the left (causal direction) at the instant 1, minus the intensity of the current point for the preceding iteration.

A convolution kernel is thus realized. During each iteration, the intensity of the current point is calculated by taking into account the past which is weighted by a weight which differs each time.

Mathematically speaking, the equation (1) can be written as the following equation 2):

$$y^1(x) = (1-\alpha) \sum_{n=0}^{\infty} \alpha^n y^0(x-n)$$

By writing the following equation (3):

$$\alpha = \exp(-1/\tau) \quad (3)$$

and within the limit of a large value of the parameter τ, the equation 2) is written as a convolution:

$$y^1(x) = (1/\tau) \int_0^\infty \exp(-u/\tau) y^0(x-u) du \quad (2\text{bis})$$

in which u is the distance from the current point x.

In comparison with a non-recursive filter, a recursive filter offers the advantage that it requires substantially fewer calculations. For example, if a simple filtering operation is performed on 25×25 pixels, it would be necessary to perform 625 multiplications in order to determine the intensity of each pixel of the filtered image.

In the case of the recursive filter defined above, the expression (2bis) demonstrates that simply a single multiplication is performed so as to obtain the new intensity of each pixel of the filtered image.

Figure 5B:
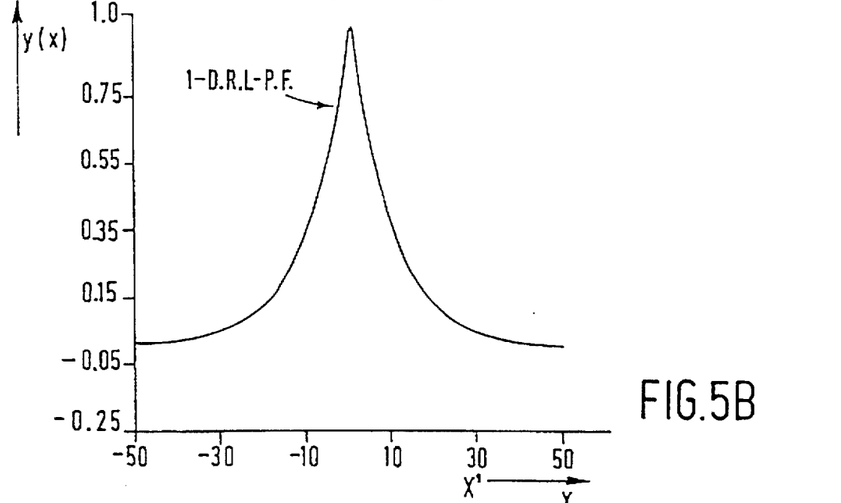
FIG. 5B shows a convolution kernel of a one-dimensional recursive mathematical low-pass filter obtained by the causal and anticausal pass of the filter shown in FIG. 5A.
Figure 5C:
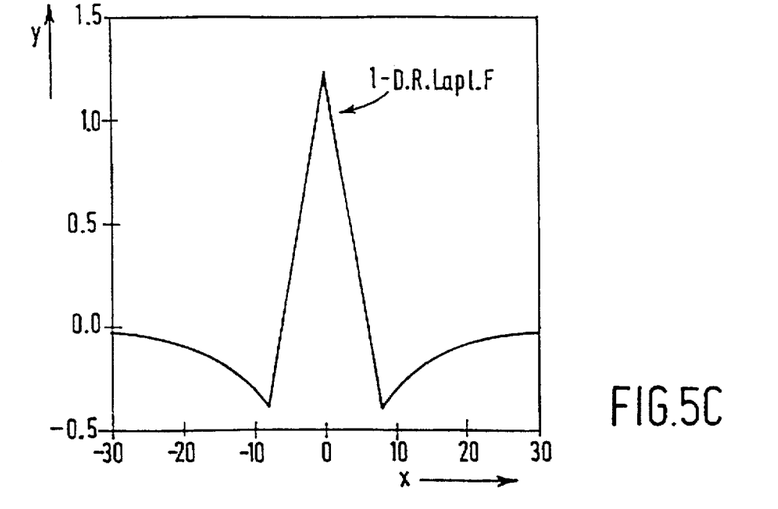
FIG. 5C shows a convolution kernel of a one-dimensional Laplacian mathematical filter.

Another aspect of this recursive filter defined by the relations (2bis) and (3) consists in that if, after the passage of this filter across the image parallel to the axes of the abscissae in the direction which is referred to as the causal direction, this filter is displaced again parallel to the axis of the abscissae but then in the opposite direction, which is referred to as the anti-causal direction, so that a convolution kernel is obtained which is shaped as the curve shown in FIG. 5B. The corresponding function is given by the relation (2ter):

$$y'(x) = (1/2\tau) \int_{-\infty}^{+\infty} \exp(-|u|/\tau) y^0(x-u) du \quad (2\text{ter})$$

The passage along the causal and anti-causal scanning axis X'X of the recursive one-dimensional filter corresponding to the convolution kernel represented by the function (2ter) thus enables the implementation of an extremely selective low-pass filter which is referred to as a 1-D.R.L.-P.F. (One-Dimensional Recursive Low-Pass Filter).

The width of the passband of the filter is controlled by the constant τ which is in this case not exactly a time constant but a constant of length because it controls the width of the filter on the axis of the abscissae (x) or the scanning axis of the image formed by pixels. Thus, this recursive filter can be rendered adaptive because it can control this constant of length.

This one-dimensional filter enables, by ultimately carrying out two other passes, i.e. one causal and one anti-causal but along an axis Z'Z perpendicular to the initial scanning direction, denoted as X'X, implementation of a bi-dimensional filter which is denoted as 2-D.R.L.-P.F. (Bi-Dimensional Recursive Low-Pass Filter) whose pulse response is shown in perspective in three dimensions in FIG. 6A. The third dimension is that of the intensity y. Thus a filter with a bi-dimensional convolution kernel is realized. It suffices to initialize the rows of the digitized image, and the columns of this image, with the initial intensities of each pixel. Subsequently, the image is scanned entirely parallel to the rows, once in the causal direction and once in the anti-causal direction (therefore, two multiplications per point). Subsequently, the image is scanned entirely parallel to the columns, once in the causal direction and once in the anti-causal direction (thus, two further multiplications per point). The term "causal" signifies herein the direction of the ascending abscissae or ordinates and the term "anti-causal" signifies the opposite direction relative to these coordinate axes.

The bi-dimensional filter thus formed offers major advantages. First of all, in comparison with the foregoing, the execution of this filtering operation requires only four multiplications for the calculation of a new intensity at each image point. This implies an enormous saving as regards calculations in comparison with the number that would be necessary if a non-recursive filter were used (for example, 625 multiplications per point).

Figure 6A:
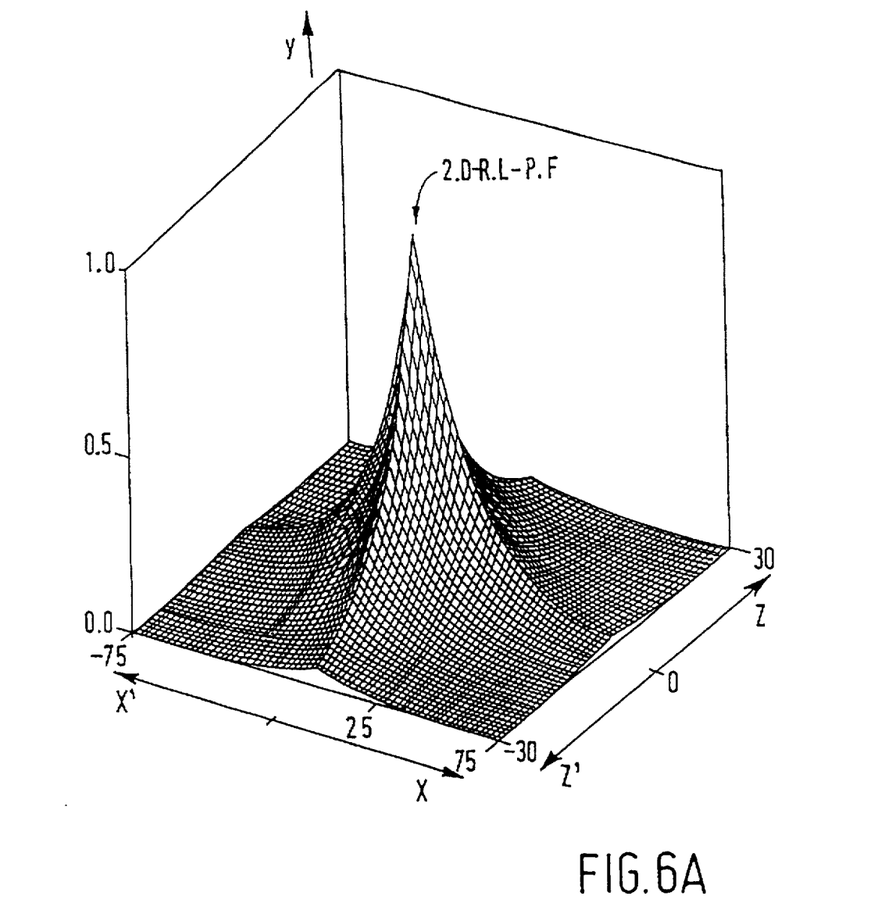
FIG. 6A is a perspective view of a convolution kernel of a lozenge-type bi-dimensional recursive mathematical low-pass filter.

Finally, this filter can be extremely selective as appears from FIG. 6A.

Figure 7A:
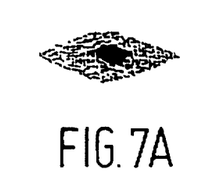
FIG. 7A through 7I show different feasible orientations of the axes of the bi-dimensional low-pass filters in the plane of the image.
Figure 7B:
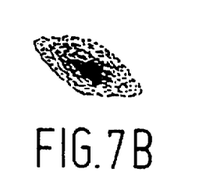

It also appears that in the bi-dimensional kernel a value of the length constant τ can be chosen which differs for the passes parallel to the axis of the abscissae X'Y, and for the passes parallel to the axis of the ordinates Z'Z. Thus, the filter support is increased in one direction which is referred to as the principal direction of the filter. The projection onto the plane of the image of the three-dimensional function of FIG. 6A thus constitutes a lozenge having the axes X'X and Z'Z as shown in FIG. 7A, in which the large support constitutes the major axis, X'X, and the small support of the filter constitutes the minor axis, in this case Z'Z.

It appears that this bi-dimensional filter, having a support in the form of a lozenge, is particularly suitable for the convolution of the image of a given vessel formed initially by a dark band on a light background and extending parallel to the major axis of the lozenge, in a row of points situated on the central line or median of the vessel.

Thus, by performing a scan of a digital image such as that shown in FIG. 3A by means of a filter as described above with reference to FIG. 7A, this scan being performed on the one hand parallel to the major axis of the filter and on the other hand perpendicularly thereto, it can be observed that:

upon passage across any vessel segment extending parallel to the major axis of the filter, the latter shows:
a strong intensity response during the scanning of the image parallel to its principal direction,
a high selectivity during the scanning of the image perpendicularly to its principal direction, upon passage across any segment which is not parallel to the principal direction of the filter, the latter exhibits a low intensity response and a low selectivity.

Consequently, by way of scans parallel to and subsequently perpendicular to the major axis of the filter, all parts of vessels which extend locally parallel to the principal direction of this filter and are present in an image as that shown in FIG. 3A can be detected.

In order to enhance the precision of detection, a further filtering operation can be performed by means of a convolution kernel in the form of, for example Laplacian filter shown in FIG. 5A and denoted by the reference 1-D.R.Lapl.F (One-Dimensional Recursive Laplacian Filter) which particularly subtracts the continuous components. This Laplacian filter is neither a filter different from the bandpass filter described above nor a supplementary filter.

It is a filter which is deduced from the above bandpass filter during a second operation, or a second calculation procedure, of this phase 1 of the step 2. During this second operation a new value of the intensity of the pixels is calculated by taking the intensity calculated by means of the one-dimensional filter described with reference to FIG. 5B for each pixel, being referred to as the central pixel in this case, and by subtracting therefrom a fraction, for example half, of the intensity of a pixel at a given transverse distance to the right, and the same fraction, for example half, of the intensity of a symmetrical pixel at the same transverse distance to the left of this central pixel, scanning taking place parallel to the axis X'X of the bi-dimensional low-pass filter, i.e. parallel to its major axis.

Figure 6B:
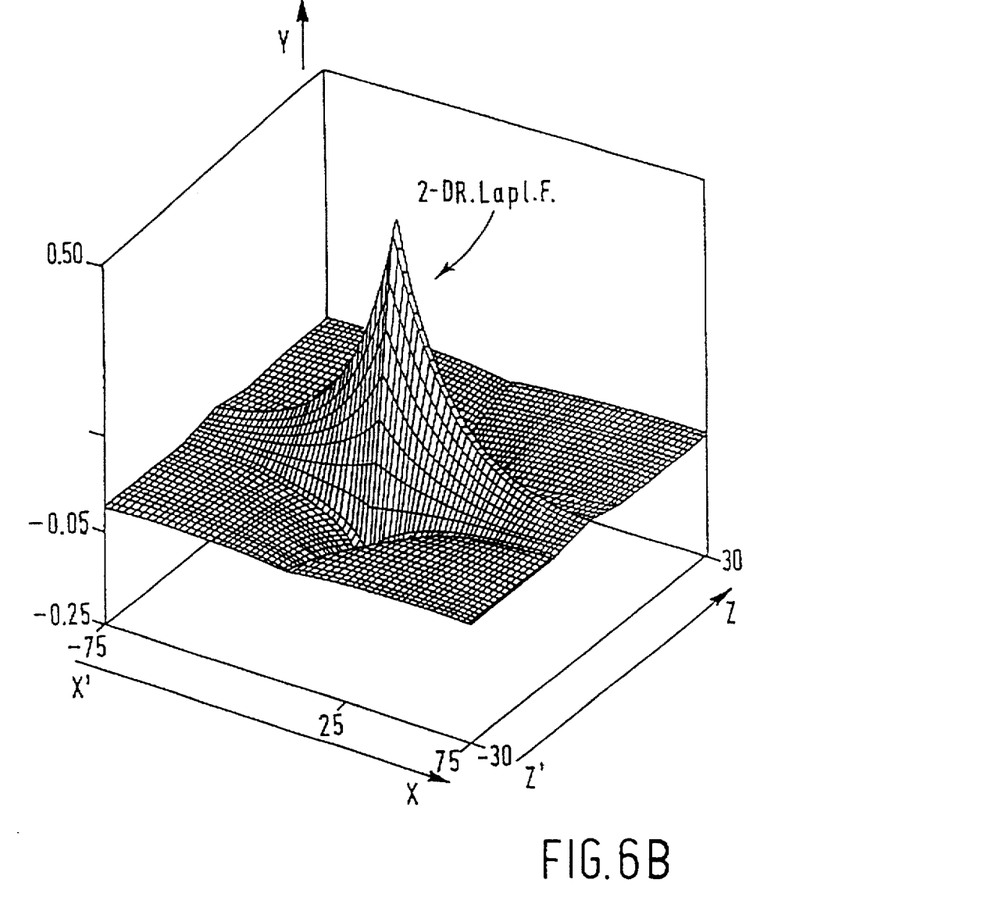
FIG. 6B is a perspective view of a convolution kernel of a bi-dimensional Laplacian mathematical filter having axes parallel to those of the filter shown in FIG. 6A.

The desired Laplacian kernel filter as shown in FIG. 6B, being a dimensional filter which is referred to as 2D.Lapl.R.F. (Two-Dimensional Laplacian Recursive Filter), is thus realised because these operations are performed in each of the passage directions of the low-pass filter, i.e. first X'X causal and anti-causal, and then Z'Z causal and anti-causal. Thus, having performed a first filtering operation by means of a low-pass recursive filter of the type shown in FIG. 6A, and subsequently a second calculation operation in which from the intensity of each pixel there is subtracted a fraction or half of that of neighbours in a transverse direction, a response is obtained which is equivalent to the response which would be obtained by directly filtering the image by means of the Laplacian filter of FIG. 6B. However, in accordance with the invention this result is obtained with an enormous saving of calculation time.

At the end of these two operations or calculation procedures, there have been determined the regions of the image giving a maximum response to filtering, because they correspond to a vessel segment whose direction is parallel to the principal direction of the low-pass filter.

It is to be noted that the Laplacian kernel filter is more open in the scanning direction X'X. It thus permits, in this example, the detection and classification of all vessel segments extending parallel to this general direction.

Figure 8A:
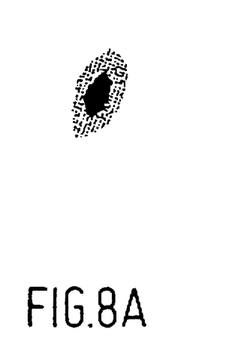
FIGS. 8A and 8B show, for the same given orientation, the convolution kernel of the recursive low-pass filter and the Laplacian filter derived therefrom.
Figure 8B:
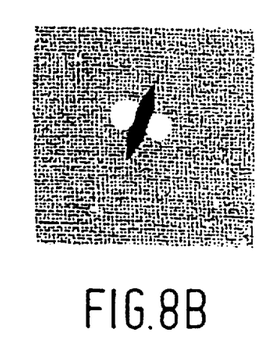

In order to demonstrate the effect of the two operations described above, FIG. 8A shows the pulse response of a low-pass bi-dimensional filter oriented at an angle of 112.5° with respect to the axis of X, and FIG. 8B shows that of the Laplacian filter of the same orientation.

All vessels of the coronary tree as shown in FIG. 3A and all parts of the same vessel, however, do not have an identical orientation, for example a horizontal orientation, so as to be detected by the filter corresponding to FIG. 7A which has a horizontal principal axis.

In order to solve this problem, in addition to the lozenge-type bi-dimensional filter of FIG. 7A there is provided an array of filters, each of which is oriented in a different manner relative to the vertical or the horizontal. Actually, to each of these filters there can be imparted any orientation possible in the plane, which orientations are indicated by the angle of the major axis of the lozenge relative to the horizontal axis of the images, that is to say the direction of the lines of the digitized image. For filtering the image is then successively scanned by means of each of the filters, parallel to its major axis and to its minor axis. As a result, the calculation is now performed as before, in the causal and the anti-causal sense, along the rows and columns parallel to the axes of the lozenge. A minor problem occurs because of the fact that these axes do not necessarily pass through the points of the network of the digitized image, because of their disorientation, advance knowledge of the initial intensity of said points being necessary for the calculations of the convolution function. In this case this intensity is determined by interpolation on the basis of the intensity of neighboring pixels.

For application to the processing of digitized angiographic images, a number of N=8 filtering directions generally suffices.

These directions have been chosen, for example as follows: 0°, 22.5°, 45°, 67.5°, 90°, 112.5°, 135°, 157.5° with respect to the horizontal of the original digital image, i.e. regularly disoriented from $\pi/N$ in $\pi/N$.

Figure 7C:
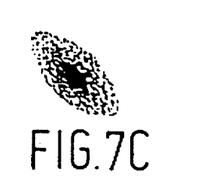
Figure 7D:
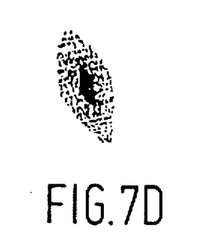
Figure 7E:
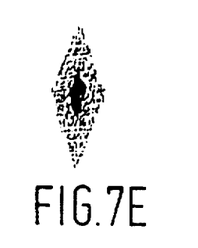
Figure 7F:
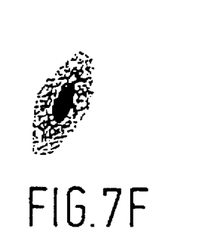
Figure 7G:
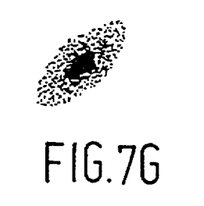
Figure 7H:
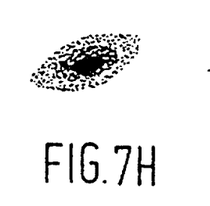
Figure 7I:
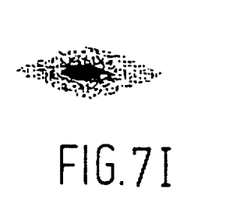

Such a set of bi-dimensional filters in the form of a lozenge is shown, by way of example, in the FIGS. 7A to 7H, in all directions from 0° to 57.5°, from 22.5° in 22.5° FIG. 7I shows that at 180° the filtering is the same as at 0°.

It clearly shows that the topology of the bi-dimensional filter in the form of a lozenge as described above with reference to FIG. 7A is not changed by this rotation. For each of the eight orientations defined above there is obtained a filtered image by performing two iterations (one causal and the other anti-causal) in conformity with the principal orientation of the filter, and subsequently by performing two further iterations (causal and anti-causal) in conformity with the secondary orientation which is perpendicular to the first orientation. The scans take place along these eight directions of the filters and utilize, if necessary, intensity values obtained by interpolation. Thus, N filtered images are obtained.

In each filtered image the responses of the filter used enable determination of all vessel segments having the same orientation as the principal axis of this filter, because the responses of this filter are higher when the object, that is to say the vessel segment, is aligned relative to the principal direction of said filter.

Phase 2: determination of the central points of each of the vessel segments.

Once the direction of each vessel segment has been determined in each of the N images obtained by the filtering of such an image, as produced by the step 1, by the scanning by means of each of the N filters as described in phase 1, a third operation or calculation procedure is performed which constitutes phase 2 of step 2. This third operation consists in examining, in each of these N images, the intensity of the pixels calculated by means of the preceding filters in each of the segments retained, and to establish in which point a minimum value of the local intensity is found during the scanning by the filter perpendicularly to its principal direction, that is to say perpendicularly to the direction of the vessel segment. This local minimum intensity in the direction transversely of the direction of the vessel corresponds to the local maximum of the intensity response of the filter, and hence corresponds to the pixel (or point) situated exactly on the median line of this vessel segment. This treatment is applied to all vessel segments of each image resulting from the filtering by each of the N filters so as to determine all pixels situated on the median lines of all vessels of the image as shown in FIG. 3A.

Figure 3B:
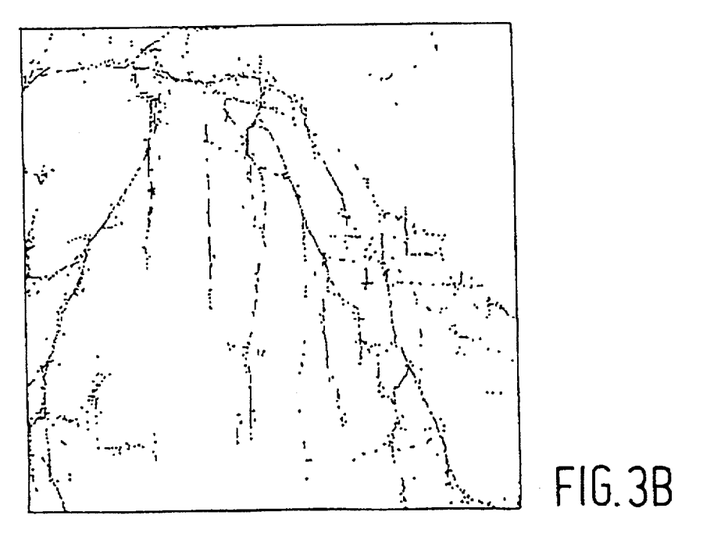
FIG. 3B shows a digital angiographic image which has been subjected to the processing steps supplying the skeleton of vessels which is formed by all centre points of the vessels.

In accordance with the invention, at the end of the step 2, performed during the phase 1 and the phase 2 applied to the angiographic image of FIG. 3A, the process thus supplies the "skeleton" of the coronary tree as illustrated, for example by FIG. 3B, which is formed exclusively by points resulting from the previously described operations performed during said step 2, localized on the median lines of the blood vessels. This "skeleton" is characterized by the fact that in each point the response of one of the filters used, which could of course be more numerous, is maximum. This signifies that during the scanning of the image by means of the filter in the direction perpendicular to the major axis, i.e. along its minor axis, the response is weaker to both sides of the point retained as being a skeleton point.

The localization of these points may be considered to be very accurate, because it results from a homogeneous mathematical treatment applied to the points of the original digitized image whose initial intensity is a measure. By searching the minimum of the intensities in the image filtered, the central points are selected and the other points are eliminated as appears from the FIGS. 3A and 3B.

STEP 3: LOCALIZATION OF THE EDGES OF THE VESSELS.

The localization of the edges of the vessels is performed one image after the other, that is to say on each of the N filtered image taken one by one and containing the central points of vessel segments having a given direction. This step corresponds to the functional block 3 of the diagram of FIG. 2. Several methods are permissible for carrying out this step 3. Two feasible methods will be described hereinafter.

In a first version, the edges of the vessel can be determined by calculating the derivative of the intensity profile perpendicularly to the axis of the central line of the vessel. The edge lines of the vessel are detected by regrouping the edge points in pairs.

In another method for detecting the edges of the vessel, the correlation of the intensity profile transversely of the vessel with crenellations of different widths, can be searched.

Regardless of the method chosen, the determination of the edge points is accurate because it is based on the prior accurate determination of the central points.

Moreover, regardless of the method chosen, it is executed by performing systematic scans in the given number of N directions, for example 8 directions perpendicularly to the central lines of the vessel segments in the N images. It can be fully automated. It need not be guided.

Figure 9A:
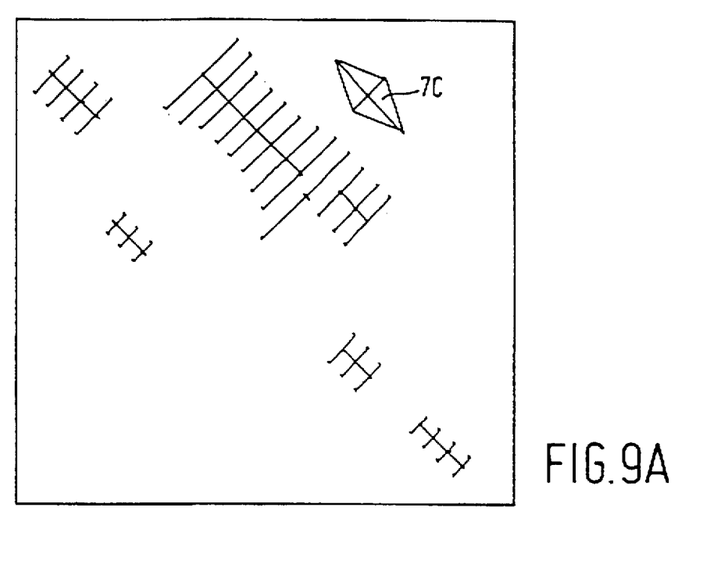
FIGS. 9A and 9B illustrate the result of the filtering of a digital image as shown in FIG. 3A by means of filters as shown in the FIGS. 7C and 7E, respectively, in order to define first of all the parts of vessels having locally the same orientation as each of the respective filters, and for determining the center points of these parts of vessels having locally said orientation, thus enabling subsequently the determination of the width of these parts of vessels perpendicularly to this orientation.

FIG. 9A shows diagrammatically the result of the processing of a digital image as appears at the end of step 1. First of all, the image is subjected to a filtering operation in conformity with phase 1 of step 2, the image then being scanned by means of a lozenge-type filter 7c which is inclined at an angle of 45°, as shown in FIG. 7C, or the corresponding Laplacian filter. This calculation procedure produces a filtered image which corresponds to the orientation of the filter used and in which all vessel segments are detected whose axis is parallel to the principal direction of the filter 7c. Finally, the calculation process in conformity with phase 2 of step 2 is applied to this filtered image, allowing for the selection of the central points of the vessels as the response maxima of the filters perpendicularly to their principal direction. Finally, the filtered image, in which the central points have thus been localized, is subjected to the calculation operation according to step 3 which enables determination of the width of the vessels at the level of each central point.

Figure 9B:
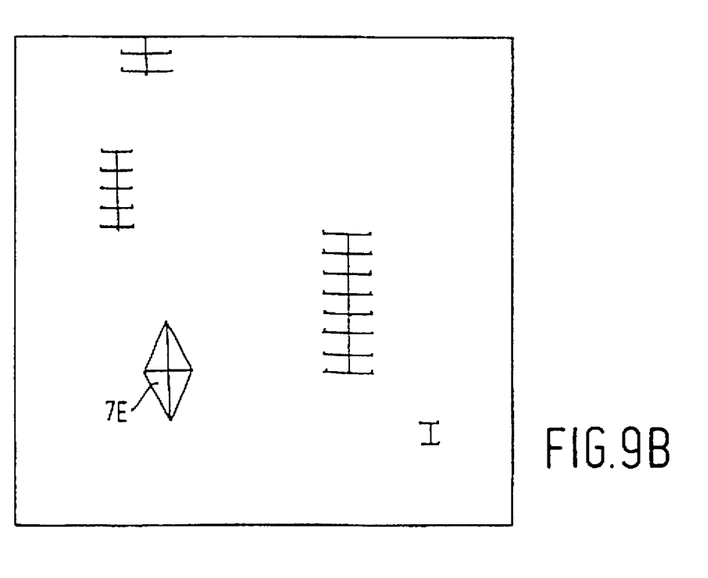

FIG. 9B illustrates the same operations and results obtained on the basis of the same original digital image, as it appears at the end of the step 1, for example as shown in FIG. 3A, which has this time being treated in step 2 by the scanning by means of the lozenge-type or Laplacian filter 7e having a principal vertical axis as shown in FIG. 7E. After the steps 2 and 3, the results consist of a filtered image which provides the localization of the central points of the vertical vessel segments and their local widths.

The execution of the steps 2 and 3 with each of the N filters of different orientation produces a filtered image which shows the centre points and the local widths of the vessel segments having the orientation of the specific filter.

Therefore, FIG. 3B shows an image, reconstructed after the step 2 on the basis of the data of these N filtered images, in order to reproduce the skeleton of all vessels.

Figure 10:
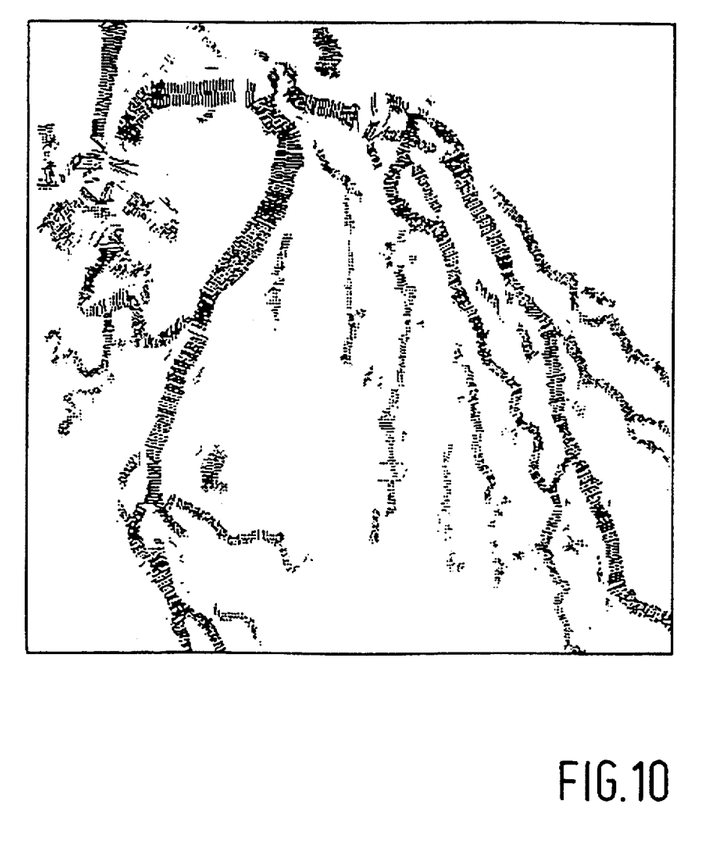
FIG. 10 shows the result of the three processing steps in accordance with the invention applied to a digital angiographic image, the result consisting of a regrouping, in the same digital image, of the widths of vessel previously determined for each of the segments locally extending parallel to the directions of the filters shown in FIG. 7A through 7I.

FIG. 10 shows an image reconstructed after the step 3, on the basis of the data of these N filtered images, in order to reproduce the local widths of all vessels.

The seriousness of the stenosis is subsequently determined. To this end, once the edges of the vessel have been determined, the regions are localized in which strictures of the vessels occur and the intensity profiles in these regions are examined. At that instant a decision is taken so as to indicate whether the stricture actually corresponds to an anomaly.

As has already been stated, the invention can also be applied to the determination of the contours of other objects in the form of contrasting bands on a background which can be obtained substantially uniformly by means of an operation in conformity with step 1.

I claim:

1. A method for the processing of a digital image, comprising the representation of objects in the form of contrasting bands of substantially uniform intensity on a substantially uniform background, which method comprises a tracking procedure for the identification of pixels situated on the central lines of the objects, characterized in that said tracking procedure comprises a first filtering operation which is executed by applying to the digital image a set of N bi-dimensional, recursive, oriented, selective low-pass filters, to produce a set of N respective filtered images, N being an integer greater than 2, each filter having a lozenge-shaped base and a major principal axis, the major principal axes of the filters being angularly spaced apart 180°/N, said set of filters being applied in such a manner that each filter is passed on points of said digital image along lines and columns parallel and perpendicular to the major principal axis of its base, in causal and anticausal directions, to produce the respective filtered image, the existence and direction of each band-shaped object segment in the digital image being determined from said set of filtered images.

2. A method for the processing of a digital image, comprising the representation of objects in the form of contrasting bands of substantially uniform intensity on a substantially uniform background, which method comprises a tracking procedure for the identification of pixels situated on the central lines of the objects, characterized in that said tracking procedure comprises a first filtering operation which is executed by applying to each image a series of N lozenge-type bi-dimensional, selective, recursive low-pass filters, having respective ones of their principal directions angularly spaced apart 180°/N in order to determine the direction of each band-shaped object segment as that where the response of one of the N filters is maximum, and in that, in order to improve the selectivity of the first filtering operation, the tracking procedure comprises a second operation which is executed by subtracting, from the intensity of each pixel, a fraction of the intensity of a pixel which is situated at a given transverse distance to its left with respect to the principal direction of the low-pass filter giving the maximum response, and an equal fraction of the intensity of a pixel situated at the same distance to its right, said first and second operations being equivalent to the application, to each image, of a series of N bi-dimensional Laplacian filters having the same principal directions as the N preceding recursive low-pass filters.

3. A method for the processing of a digital image, comprising the representation of objects in the form of contrasting bands of substantially uniform intensity on a substantially uniform background, which method comprises a tracking procedure for the identification of pixels situated on the central lines of the objects, characterized in that said tracking procedure comprises a first filtering operation which is executed by applying to each image a series of N lozenge-type bi-dimensional, selective, recursive low-pass filters, having respective ones of their principal directions angularly spaced apart 180°/N in order to determine the direction of each band-shaped object segment as that where the response of one of the N filters is maximum, and in that the tracking procedure comprises a third operation for the identification of points of central lines of band-shaped objects by determination of the local maxima of the intensity response of the filters, transversely of the directions of the objects determined by the filtering during the first filtering operation.

4. A method as claimed in claim 1, characterized in that parameters of the filters are chosen so as to obtain a higher selectivity in one of the principal directions.

5. A method as claimed in claim 1, characterized in that the tracking procedure is preceded by a background extraction procedure.

6. A method as claimed in claim 5, characterized in that the background extraction procedure is executed by a morphological closing method for the determination of the upper envelope of the intensity profiles in the image, which envelope enables evaluation of the image background which is subsequently subtracted from the image in order to ensure that, at the end of this subtraction operation, the image contains only the contrasting band-shaped objects on a substantially uniform background.

7. A method as claimed in claim 3, characterized in that it further comprises a step for the extraction of the contour of band-shaped objects on the basis of the localization of their center points.

8. A method as claimed in claim 7, characterized in that the pixels of the edges of the band-shaped objects are extracted by a method for the correlation of the intensity profiles perpendicularly to the axis of the central line of the band-shaped object with crenellations.

9. A method as claimed in claim 1, characterized in that the number N of bi-dimensional, recursive low-pass filters amounts to 8.

10. A method as claimed in claim 1, characterized in that the tracking procedure comprises a second operation for the identification of points of central lines of band-shaped objects by determination of the local maxima of the intensity response of the filters, transversely of the directions of the objects determined by the filtering during the first operation.

11. A method as claimed in claim 2, characterized in that parameters of the filters are chosen so as to obtain a higher selectivity in one of the principal directions.

12. A method as claimed in claim 10, characterized in that parameters of the filters are chosen so as to obtain a higher selectivity in one of the principal directions.

13. A method as claimed in claim 2, characterized in that the tracking procedure is preceded by a background extraction procedure.

14. A method as claimed in claim 3, characterized in that the tracking procedure is preceded by a background extraction procedure.

15. A method as claimed in claim 12, characterized in that the tracking procedure is preceded by a background extraction procedure.

16. A method as claimed in claim 4, characterized in that it further comprises a step for the extraction of the contour of band-shaped objects on the basis of the localization of the center points.

17. A method as claimed in claim 12, characterized in that it further comprises a step for the extraction of the contour of band-shaped objects on the basis of the localization of the center points.

18. The method of claim 1 where N is an integer $\geq 3$.

* * * * *